F. J. REDMOND.
SANITARY APPARATUS FOR ANIMAL STALLS.
APPLICATION FILED DEC. 16, 1911.
1,030,921.
Patented July 2, 1912.
2 SHEETS—SHEET 1.
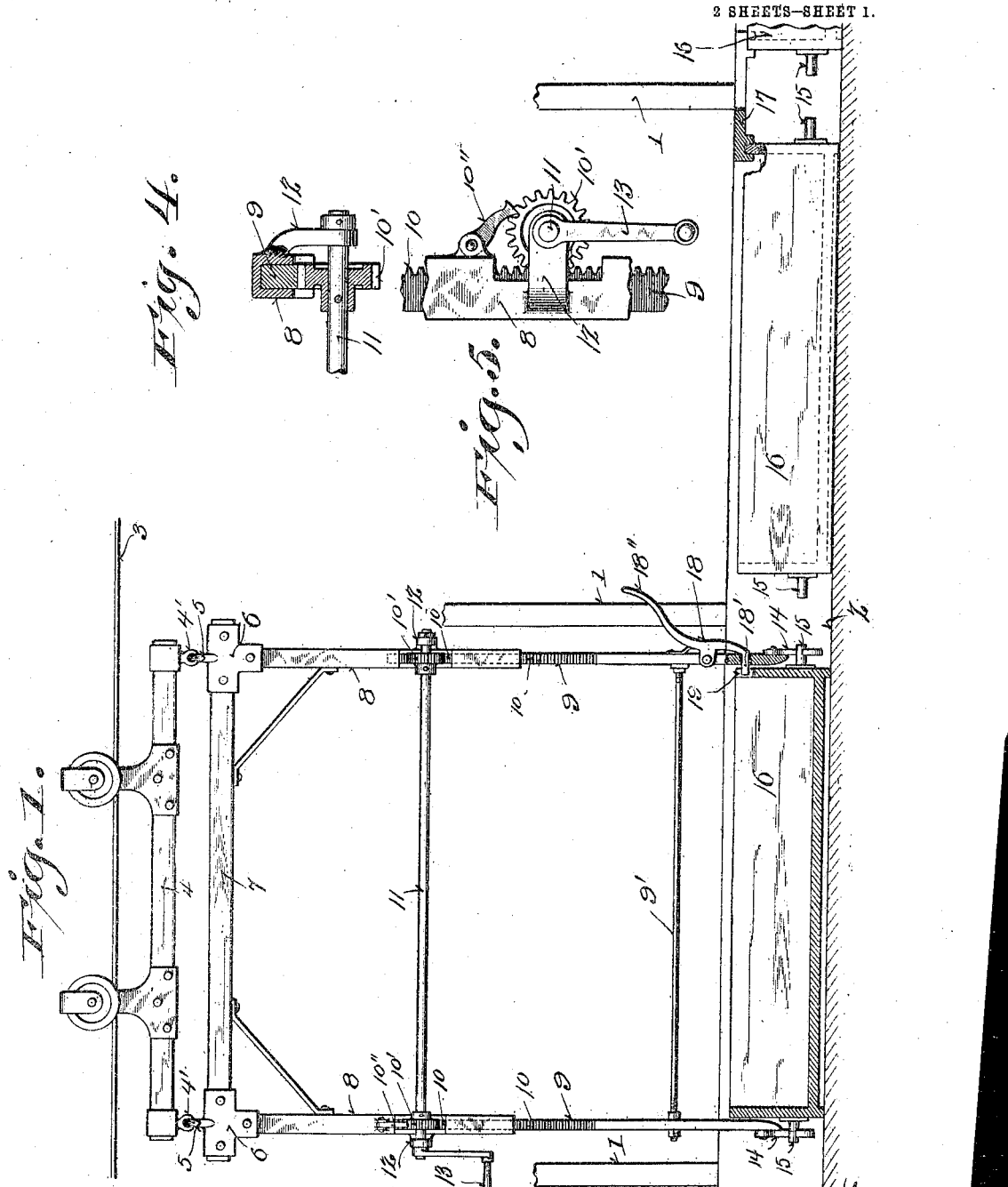

F. J. REDMOND.
SANITARY APPARATUS FOR ANIMAL STALLS.
APPLICATION FILED DEC. 16, 1911.
1,030,921.
Patented July 2, 1912.
2 SHEETS—SHEET 2.
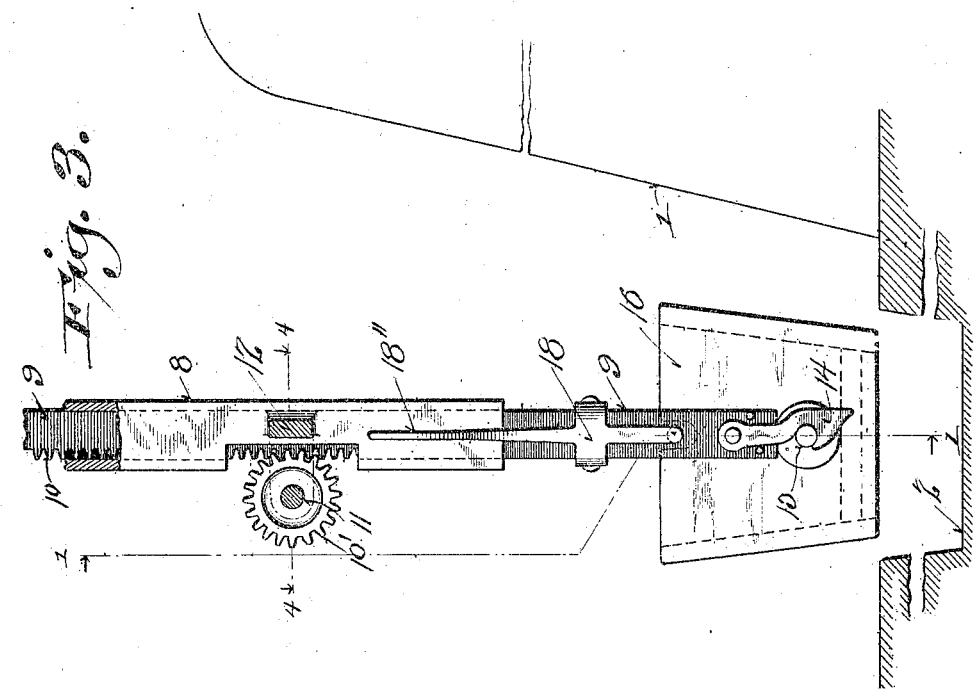
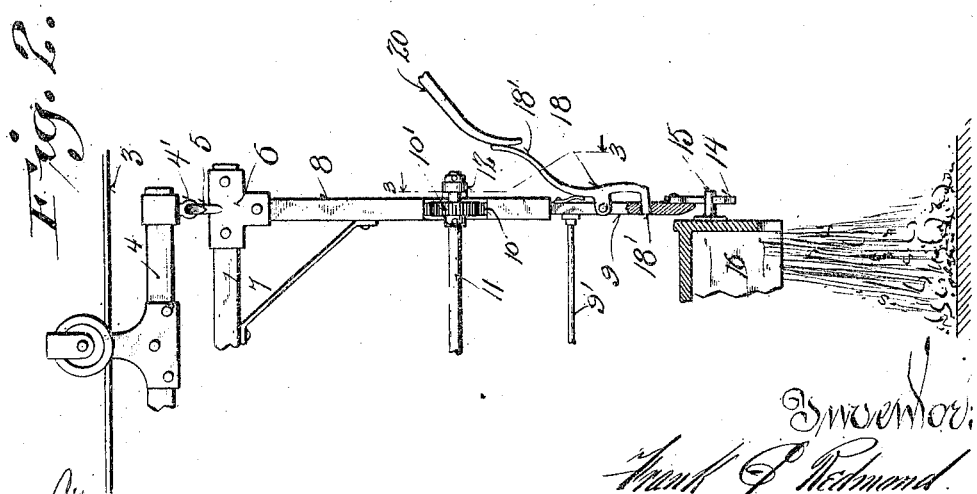

UNITED STATES PATENT OFFICE.

FRANK J. REDMOND, OF FOREST, WISCONSIN.

SANITARY APPARATUS FOR ANIMAL-STALLS.

1,030,921.

Specification of Letters Patent.     Patented July 2, 1912.

Application filed December 16, 1911. Serial No. 666,298.

*To all whom it may concern:*

Be it known that I, FRANK J. REDMOND, a citizen of the United States, and resident of the town of Forest, in the county of Fond du Lac and State of Wisconsin, have invented certain new and useful Improvements in Sanitary Apparatus for Animal-Stalls; and I do hereby declare that the following is a full, clear, and exact description thereof.

My invention refers to sanitary improvements for animal stalls and has for its object to provide a simple, economical apparatus for handling and disposing of the droppings of animals that are confined therein.

The construction and arrangement employed in carrying out my invention comprises an overhead carrier that is disposed rearwardly of the stalls, the same being adapted to be coupled to any one of a series of individual dropping trays, which trays are normally seated in the troughs or basin that are usually employed in modern stables, the basin or trough being below the floor-line. In this instance the trays form a part of the stable equipment and when any one of the trays is to be removed it is coupled to the carrier mechanism and hoisted from its seat within the basin. The said carrier together with the loaded tray is thereafter conveyed to the stable-yard in the ordinary manner, the tray being dumped of its contents and returned to the trough. It is apparent that by employing an apparatus of this character a great saving in time and labor is accomplished and efficient sanitation insured.

With the above and other objects in view the invention consists in certain peculiarities of construction and combination of parts as hereinafter set forth with reference to the accompanying drawings and subsequently claimed.

In the drawings Figure 1 represents a rear fragmentary view of two stalls equipped with a manure carrier apparatus embodying the features of my invention, parts of the apparatus being broken away and parts in section to more clearly illustrate structural features, the section being indicated by line 1—1 of Fig. 3; Fig. 2, a fragmentary elevation of the carrier showing a tray coupled thereto and elevated from the dropping trough in its dumped position, the carrier in this instance having been conveyed from the barn to a point of discharge, at which point said tray is automatically dumped by trip mechanism; Fig. 3, represents an enlarged detail end view of a portion of the carrier and tray in their elevated position, the view being shown partly in section as indicated by line 3—3 of Fig. 2; Fig. 4, a detailed cross-section of the hoisting mechanism, the section being indicated by line 4—4 of Fig. 3, and Fig. 5, a detailed end view of the hoisting mechanism looking from the drive side thereof.

Referring by characters to the drawings, 1, 1, represent stall partitions and 2 a continuous catch-basin or trough which runs transversely of the stall partitions and rearwardly thereof, this construction being ordinary in modern stables. Located above the trough is a cable track 3 upon which is mounted a trolley 4 comprising a pair of sheaves and a reach bar, the reach bar being provided with eyes 4' for the reception of hooks 5 which are detachably fitted therein. These hooks project from corner irons 6 of a detachable frame that comprises a horizontally disposed truss-bar 7 and vertically disposed hollow columns 8, which columns are preferably rectangular in cross-section, the same being secured at the upper ends to the corner irons 6. The columns 8 have fitted therein suspension bars 9, which bars are in telescopic union therewith and are provided with rack tooth edges 10 for meshed engagement with toothed pinions 10', the same being secured to a shaft 11 that is journaled in bearings 12 carried by the hollow columns, it being understood that these columns are cut away opposite the pinions to permit meshed engagement of the racks and pinions. One end of the shaft 11 is arranged to receive a hand-crank 13, whereby the shaft and its pinions are rotated, this mechanism constituting a hoist whereby the suspension bars may be raised or lowered. The said bars, together with the rectangular frame form a carrier which can be detached from the trolley when not in use owing to the hook and eye connection therewith.

Pivotally connected to the ends of the suspension bars are gravity-controlled snatch hooks 14, which hooks are provided with obliquely disposed nose portions adapted to have engagement with trunnions 15 that are secured to the ends of a series of portable trays 16, the trays being arranged to seat within the trough 2, each rearwardly of a stall as shown. These trays fit snugly within the trough and are spaced apart and held by cleated cover boards 17, which fit over and engage the upper edges of said troughs, the cover-boards being provided for the purpose of closing the gap between the trays in order that the refuse may be trapped from entering the trough proper and will thereby all be deflected into the trays.

One of the suspension bars 9 has fulcrumed thereto above its snatch-hook a spring-controlled clutch lever 18, the same having a nose 18' that passes through an aperture in the suspension bar, which nose is arranged to enter a notch 19 that is formed in the adjacent tray end and by this interlocked engagement the said tray is prevented from swinging upon its temporary trunnion connection with the carrier, the said trunnion connection being formed through engagement of the trunnions with open sockets of the snatch-dogs. The clutch-dog 18 is also provided with a tail 18'' which is adapted to engage a trip-arm 20 that may be attached to the rail 3 in the barnyard or to any convenient point of anchorage where it is desired to dump the trays.

It is apparent from the foregoing description that when it is desired to put the apparatus into operation the carrier is attached to the trolley and moved into alinement with a loaded tray 16. The suspension arms 9, which are connected by a tie-rod 9'', are then permitted to drop down and span the ends of the tray assuming the position shown in Fig. 1, it being understood that the hoisting apparatus comprising the shaft 11 and its gear connections with the bars will be manipulated to permit this movement. The gravity-controlled snatch-dogs will automatically ride over the trunnions 15 and thus form journals for the same. Incidental to this movement the nose 18' of the clutch-lever has entered the notch 19 of the tray and hence said tray is locked against oscillating upon its journals. The operator now rotates the shaft 11 in a direction to cause the suspension bars to lift, whereby the loaded tray is elevated to the desired height in order to clear obstructions, the same being locked in its elevated position by a gravity pawl 10'' which is carried by one of the columns 8 and is adapted to engage the teeth of the adjacent pinion 10'. Thus after the shaft has been revolved to effect the hoisting operation it will be locked in its position by said pawl and when it is desired to drop the suspension bar mechanism it is apparent that this gravity-dog can be thrown back from its engaging position with the pinion. The load being now elevated, the carrier can be moved or discharged by gravity to the unloading point at which point the clutch-dog will come in contact with the trip-arm 20, causing said clutch lever to disengage the tray, whereby the latter will swing downward upon its journals and discharge the load automatically. The empty tray is thereafter returned to its location back of the stall and the next tray is then gripped and conveyed in the same manner to the unloading point and so on successively until the entire series of trays have been emptied of their contents and returned.

While I have shown and described the stalls being provided with a catch-basin or drain in the form of a trough running rearward of the stalls, it is apparent that any depression may be substituted for said catch-basin, whereby the trays may be disposed upon or below the line of the floor in order that drainage therefrom can be trapped into said tray.

I claim:

1. A plurality of animal stalls, a catch-basin transversely disposed rearwardly of the stalls, a portable tray for each stall seated within the basin, an overhead carrier arranged to travel longitudinally of the catch-basins and over the same, means in connection with the carrier for selective engagement with any one of said trays, hoisting mechanism, means for locking the trays to the carrier in an upright position, and trip mechanism for releasing the lock-trays whereby they are dumped.

2. A plurality of animal stalls, a catch-basin transversely disposed rearwardly of the stalls, a portable tray for each stall seated within the basin, an overhead carrier arranged to travel longitudinally of the catch-basins and over the same, means in connection with the carrier for selective engagement with any one of said trays, hoisting mechanism, means for locking the trays to the carrier in an upright position, and an automatic trip mechanism for releasing the lock-trays whereby they are dumped.

In testimony that I claim the foregoing I have hereunto set my hand at Fond du Lac in the county of Fond du Lac, and State of Wisconsin in the presence of two witnesses.

FRANK J. REDMOND.

Witnesses:
T. J. SCANNELL,
J. F. SCANNELL.